Feb. 10, 1970   B. T. HELLSTRÖM   3,494,521
METHOD AND AN APPARATUS FOR MANUFACTURING
A GLASS KNIFE FOR A MICROTOME
Filed April 24, 1967   2 Sheets-Sheet 1
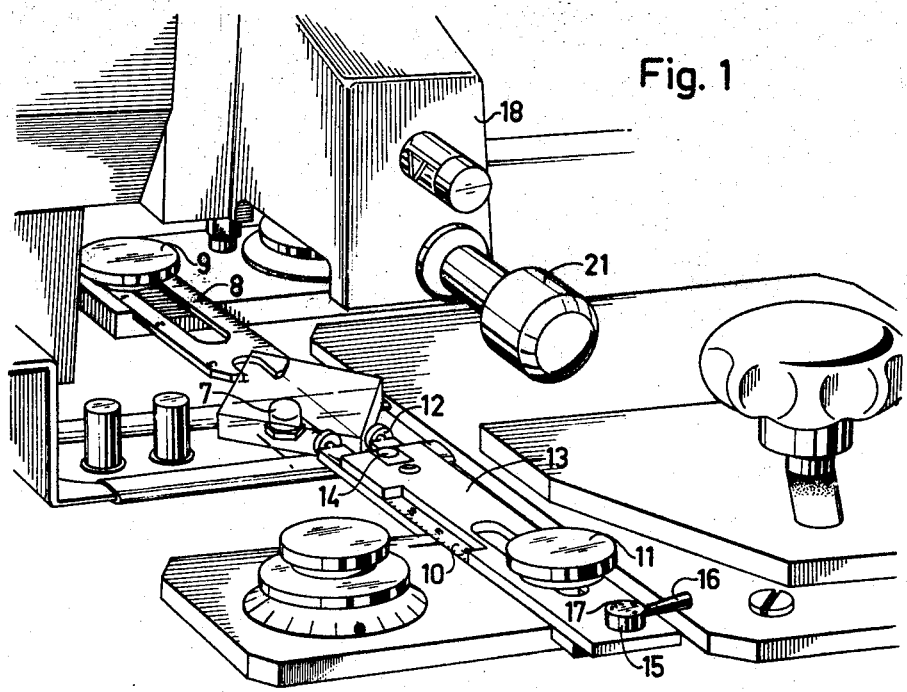
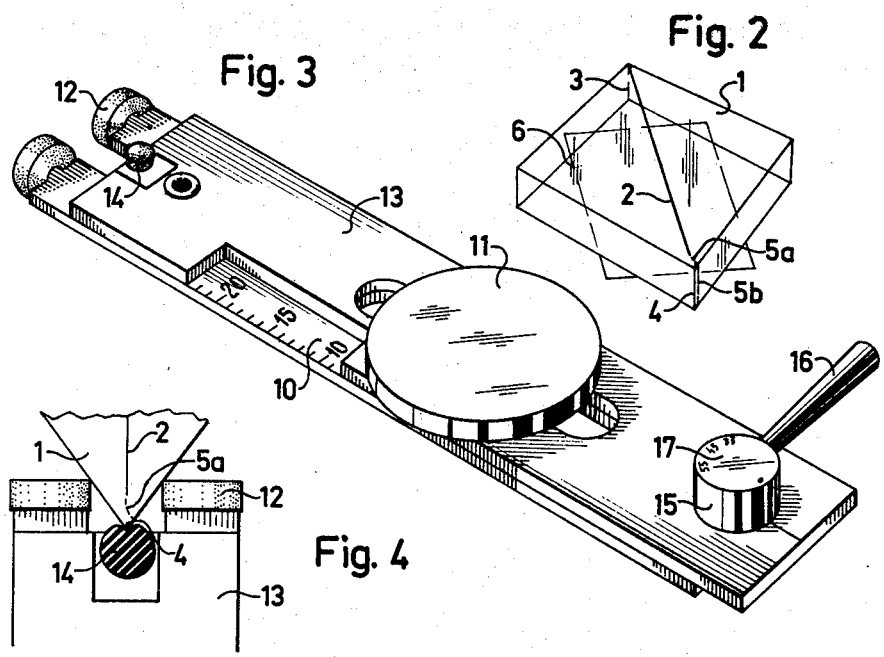

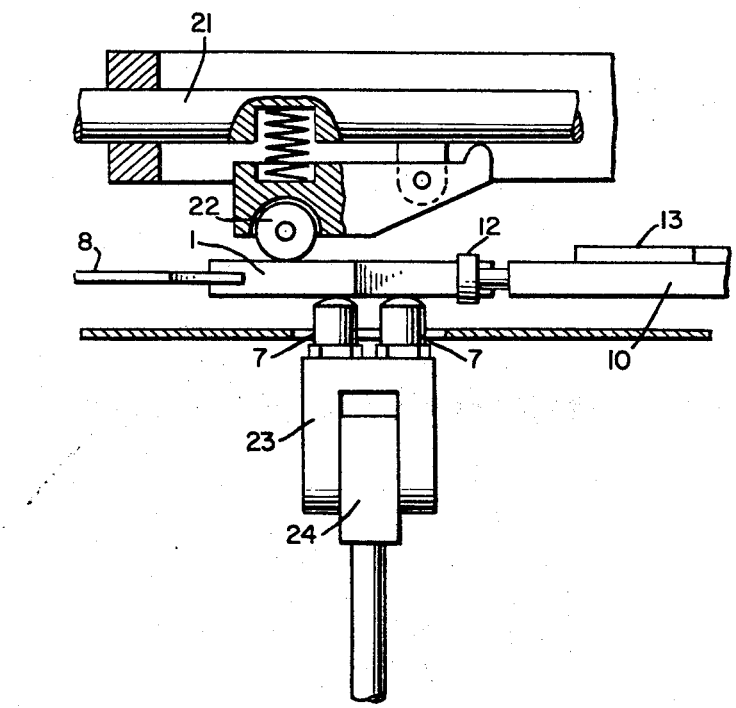

3,494,521
METHOD AND AN APPARATUS FOR MANUFACTURING A GLASS KNIFE FOR A MICROTOME
Börje Thorstensson Hellström, Bromma, Sweden, assignor to LKB-Produkter AB, Bromma, Sweden
Filed Apr. 24, 1967, Ser. No. 633,118
Claims priority, application Sweden, May 24, 1966, 7,097/66
Int. Cl. B26f 3/00; B65h 35/00
U.S. Cl. 225—96.5                                         5 Claims

ABSTRACT OF THE DISCLOSURE

The invention is concerned with the manufacture of a glass knife for a microtome by breaking a square glass plate along a line between two opposite corners. The quality of the knife is improved if a shock absorber is held in contact with one or both of said corners.

---

It is previously known that a glass knife for a microtome can be manufactured by scratching a line on a parallelopipedic glass plate, the line extending substantially diagonally between two corners of the plate, followed by the plate being split along said line, cutting edges being formed thereby on the edge faces of the plate in proximity to said corners and substantially parallel to the corner apexes.

It is further known that the general appearance of a cutting edge produced by this method can be affected by various methods. For instance, it is advantageous that the splitting forces are brought to bear completely symmetrically in relation to the line in order that the edges may be straight and run parallel to the corner apexes of the plate.

However, an edge produced in this way with known methods has certain faults. These faults are comprised of microscopic irregularities which have usually resulted in only a lesser portion of the edge having been utilizable. It has been assumed that the microscopic irregularities have been caused by vibrations arising in the glass plate during the splitting operation. Efforts have been made to reduce the effect of these vibrations by fitting shock absorbers on either the upper or lower surface of the plate and although some improvements have been achieved the result has not been entirely satisfactory.

According to the present invention it has been found that an essentially improved result can be achieved if, during the splitting operation, a shock absorber of relatively soft material is held in contact against at least one of the two corner apexes of the parallelopiped between which the line has been scratched. Although the mechanism of the splitting process is not clear, i.e. that the improvement achieved depends upon a reduction of vibrations, the term "absorber" will be used in the following specification.

The material of the absorber should preferably be relatively soft. This is due to the fact that the corner of the glass plate is frequently not completely straight, and it has been found advantageous to utilize material of such a degree of softness that the corner of the glass plate can be pressed so far into the absorber that it comes into contact with the whole length of the corner apex. In this connection rubber absorbers have been found especially suitable, these having been in the form, for example, of a cylinder with a diameter of 3–5 mm., the rubber having a hardness of approximately 90 Shore. In addition the cylindrical type is economical, the cylindrical form enabling the absorber to be used a great many times. If, for instance, the surface of the absorber has been damaged by the sharp glass edge, the cylindrical absorber can be revolved about its longitudinal axis so that an undamaged surface portion may be presented. Furthermore absorbers consisting of plastics and soft metals such as lead, aluminium and copper, have also been tested with satisfactory results.

The invention will now be more closely described whilst referring to the accompanying drawings. FIG. 1 shows an embodiment of the apparatus according to the invention. FIG. 2 shows a glass plate with a scratched line, fitted in the apparatus according to FIG. 1. FIG. 3 shows in larger scale one component of the apparatus according to FIG. 1. FIG. 4 shows one corner of a glass plate in contact with an absorber according to the present invention. FIG. 5 is an enlarged view, partly in front elevation and partly in cross-section, of that part of the device which includes conventional means for scratching a line on a glass plate and conventional means for splitting the glass plate at a scratched line.

The apparatus according to the drawing comprises a support in which two studs 7 (one only being visible in FIG. 1) are vertically displaceable by means of a manipulating device 23, 24, the distance of vertical displacement being approximately 0.1 mm. this displacement being sufficient to cleave or split a parallelopiped of glass of the desired size. A glass plate is placed on the studs 7 and although the illustrated plate is square, it may be of any other suitable parallelopiped form. The glass plate is secured by two securing means, viz. one securing means 8, having a fork shaped front portion which encloses one corner apex 3 of the glass plate, and a second securing means 10 which encloses the opposite corner apex 4 of the glass plate. It is also possible to displace both securing means along their longitudinal axes and to secure them to the support by means of screws 9 and 11. The points of the fork shaped front end of the securing means 10 are provided with members 12 of a plastic with a low friction coefficient against glass, e.g. nylon.

A shock absorption device is arranged on the securing means 10, the shock absorption device comprising a slide 13, to the forward edge of which an absorber 14 is secured, the absorber being of a cylindrical form and consisting of rubber. The slide 13 is coupled to the securing means 10 by means of an eccentric shaft 15 which is revolved by means of a lever 16. The shaft 15 is provided with a scale 17 from which the position of the slide in relation to the securing means can be read.

In addition the illustrated apparatus comprises a head 18 situated above the glass plate 1, it being possible to raise, lower and lock the head by means of a screw, not shown. The head 18 contains a scratching device which comprises a scratching roller 22, which can be moved backwards and forwards by means of a handle 21. Further, the head contains two studs, not shown, which are positioned along a line being at right-angles to the centre-line of the studs 7 which support the glass plate 1.

It is preferable when manufacturing a glass knife to fasten a piece of adhesive tape 6 to the lower face of the glass plate 1. The plate 1 is now laid on the studs 7 and the securing means 10 is propelled forward sufficiently to enable the glass plate to be securely fastened between the two securing means 8 and 10. The glass plate will be centred exactly between the two plastic members 12 due to the low friction between the glass and the plastic. The head 18 is subsequently lowered sufficiently to allow the studs on the lower face of the head to make contact with the upper face of the glass plate 1, the head 18 then being locked in that position. By pulling the handle 21 the operator now moves the scratching roller diagonally across the glass plate. Thus producing a line 2 extending substantially between the corner apexes 3 and 4. By rotating the eccentric shaft 15 the operator now moves the slide 13 forward sufficiently to allow the rubber absorber 14 to be pressed against the entire length of the corner apex 4 of the glass plate. The studs 7 are then raised sufficiently so that the glass plate is split along the scratched line. From the scratched line 2 the fracture then develops along the dotted line 5a and further along the dotted line 5b down the vertical face of the glass plate, parallel with the corner apex 4. The line 5b represents the final cutting edge. It is a known fact in this type of technique that the edge is always formed at a distance from the corner apex 4. Consequently, the absorber 14 can be easily adapted and fitted to act free of the edge 5b. During the splitting operation the two portions of the glass plate are held together by the adhesive tape 6 preventing the edge from being damaged. A similar edge is also formed near the corner apex 3 but in the present case it is only desirable to produce one edge per glass plate and therefore no measures have been taken to absorb the vibrations at the corner apex 3.

What is claimed is:

1. In an apparatus for manufacturing a knife for a microtome, comprising means for scratching a line on a parallelopipedic glass plate, said line extending substantially diagonally between two corners of said plate, and means for splitting the glass plate along the scratched line, cutting edges being formed in the vertical faces of the glass plate in proximity to the two corners and substantially parallel to the two corner apexes, the inclusion of a shock absorption means comprising an absorber of relatively soft material, and means for holding said absorber in contact against at least one of the two said corner apexes.

2. An apparatus according to claim 1, in which the absorber consists of rubber.

3. An apparatus according to claim 1, characterized by the holding means being embodied as a slide, it being possible by means of the slide, to propel an absorber forward into contact against a corner apex.

4. An apparatus according to claim 3, comprising a displaceable securing means mounted on the support of the apparatus for securing a glass plate during the scratching and splitting operations, characterized by the slide being mounted on the securing means.

5. An apparatus according to claim 2, characterized by the rubber absorber being in the form of a cylinder with a diameter of 3–5 mm., and by the rubber having a hardness of approximately 90 Shore.

References Cited

UNITED STATES PATENTS 3,207,398   9/1965   Forsstrom et al. _____ 225—9

JAMES M. MEISTER, Primary Examiner

U.S. Cl. X.R.

225—104